United States Patent [19]
Takeuchi et al.

[11] Patent Number: 4,955,416
[45] Date of Patent: Sep. 11, 1990

[54] PNEUMATIC RADIAL TIRE CARCASS PROFILE

[75] Inventors: Akihiro Takeuchi, Kobe; Kouichi Horiuchi, Akashi; Kiyoshi Ochiai; Hideaki Yoshikawa, both of Kobe, all of Japan

[73] Assignee: Sumitomo Rubber Industries, Ltd., Japan

[21] Appl. No.: 185,273

[22] Filed: Apr. 18, 1988

Related U.S. Application Data

[63] Continuation-in-part of Ser. No. 835,783, Mar. 3, 1986, abandoned.

[51] Int. Cl.⁵ .................................. B60C 3/00
[52] U.S. Cl. .................... 152/454; 152/209 R
[58] Field of Search .......... 152/454, 527, 548, 209 R, 152/209 D

[56] References Cited

U.S. PATENT DOCUMENTS

| | | | |
|---|---|---|---|
| 4,037,637 | 7/1977 | Arimura et al. | 152/454 |
| 4,082,132 | 4/1978 | Arai et al. | 152/454 X |

FOREIGN PATENT DOCUMENTS

200004  9/1986  Japan .................................. 152/454

Primary Examiner—Michael W. Ball
Assistant Examiner—Geoffrey L. Knable
Attorney, Agent, or Firm—Stevens, Davis, Miller & Mosher

[57] ABSTRACT

A pneumatic radial tire having a new carcass profile, which is characterized in that a radius $TR1$ of the radially expansive tread surface produced when the tire is mounted on the rim officially specified for use and inflated with air having 5% pressure of the specified maximum pressure, and another radius $TR2$ of curvature produced when the tire is inflated with air of the specified maximum pressure always satisfy the relation of $1.2 \leq TR2/TR1 \leq 1.5$. An above-mentioned radius of curvature increase with increasing air pressure.

10 Claims, 10 Drawing Sheets

PNEUMATIC RADIAL TIRE CARCASS PROFILE

REFERENCE TO RELATED APPLICATIONS

This application is a continuation in part of application Ser. No. 835,783, filed Mar. 3, 1986 now abandoned.

BACKGROUND OF THE INVENTION

The present invention relates to a pneumatic radial ply tire, more particularly a radial ply tire and, in particular, a radial tire suitable for use for the truck, bus, light truck and other vehicles, and is intended for providing an improved radial tire, in which various requirement for this kind of tire as resistance to cutting resistance to wear, durability to high speed running, low fuel consumption, and vehicle driving stability are well-balanced with each other and also with general characteristics indispensable for the tire such as comfortableness in vehicle riding and traction capacity without affecting these characteristics, while optimizing a radius of curvature of the shoulder part of the carcass line, mainly based a new knowledge about a radial profile of the carcass line of radial tires.

The main points of the prior art for achieving improvement in resistance of tire to wear and cutting, and saving of fuel consumption have been such means as the use of rubber highly resistant to wear and cutting for the grounding part of said tread, preparation of rubber material high in repulsive resilience.

The reduction of durability of the tire to high speed running and saving of fuel consumption due to use of the rubber compound with high resistance to cutting and wear, was made up compensate by such means that the tread was radially divided into two parts of cap tread and base tread and the rubber compound with high resistance to cutting and wear is used for the cap tread and the rubber compound with low hysteresis loss is used for the base tread.

By the use of the said counterplan, the improvement can be reached to the same extent. However, there has been a deficit that the effect of the early stage is extremely lowered from the middle use which the cap tread worn down, at the same time, the stiffness of tread region is reduced, so there have been such disadvantages as to be forced to induce the reduction of vehicle driving stability and traction capacity which are indispensable and fundamental performance for the pneumatic tires. On the other hand, owing to the use of the rubber compound with high repulsive resilience, the fuel consumption is improved but there is a problem that the traction capacity, especially the wet grip performance is reduced.

BRIEF SUMMARY OF THE INVENTION

The object of this invention is to solve such problems as above in the prior art for obtaining improvement in resistance of the tread crown part to cutting and wear, durability of the tire to high speed running, saving of fuel consumption, and driving stability without deceasing comfortableness in vehicle riding and traction capacity of radial tire, particularly, that for the truck and bus, and what is to describe below about the radial profile of this kind of tire the new knowledge concerning the carcass profile in radial section, which works the effective compression strain in the tread crown region.

DETAILED DESCRIPTION OF THE INVENTION

The technical problems as above can be solved by the following means:

A pneumatic radial ply tire is designed so as to comprise a tread reinforced with a carcass layer composed of at least a single layer of ply consisting of non-stretchable or low stretchable cords substantially radially arranged in parallel with each other and a belt layer composed of at least two layers of plies each consisting of cords arranged between said carcass ply and tread rubber, adjacent to said carcass ply, at a comparatively small degree of angle with respect to the circumferential direction of the tire, and in parallel with each other in each ply and crosswise grouped into plies, characterized in that a radius of curvature TR1 of the radially expansive surface of said tread produced when said tire is mounted on the rim officially specified for use and inflated with air having having 5% pressure of the specified maximum pressure and another radius TR2 of curvature produced when the tire is inflated with air of the specified maximum pressure always satisfy the relation such as $1.2 \leq TR2/TR1 \leq 1.5$, and profile in which said radius of curvature increase with the increase in air pressure is provided, on the other hand, a radius of curvature of the shoulder part of the carcass line becomes small with the increase in the air pressure and a radius CR1 of curvature of the shoulder part of the carcass line under the pressure corresponding to 5% of the specified maximum air pressure and another radius CR2 of curvature of the said carcass line produced when the tire is inflated with air of the specified maximum pressures always satisfy the relation such as $0.70 \approx CR2/CR1 \leq 0.95$.

Generally, a radial ply tire for truck and bus in size of 10.00R20 14PR. which is typical of this kind of tire is provided with a tread having a radius of curvature ranging from 400 to 600 mm under no load and a tread width from 180 to 200 mm when mounted on the rim of 7.50×20 and inflated with air of the regular maximum pressure of 7.25 kg/cm$^2$.

For obtaining even distribution of contract pressure against the ground surface, that is, for obtaining adequate gripping and uniform wear, a radius of curvature of the radially expansive surface of the tread should be large as far as possible. It has been known from the past that the tread is preferably provided with a flatter profile rendered by a large radius of curvature.

However, more important for obtaining not only excellent resistance of the tire to wear and cutting as one of objects of this invention but also fuel saving and driving stability is, although a large absolute value of a radius of curvature of the tread, to design a tread profile to have a radius of curvature by which compressive strain, not tensile one, is adapted to act within the tread crown part when the tire is inflated with air of the specified maximum pressure, such design enabling maintenance of lateral stiffness of the tread at high level throughout the use of the tire and, therefore, giving no disadvantage to vehicle drivability and driving stability.

Similarly, wet gripping performance and traction capacity are improved because of the increase in stiffness of the tread part, at tha same time the tread thickness gauge can be designed to be thin, which bring about the light weighted tire together with the improvement of fuel saving and the durability of high speed running, as the result, the tire which has a well-balanced capacity can be provided.

With reference to the drawings, an embodiment of this invention will be described in detail.

Figure 2:
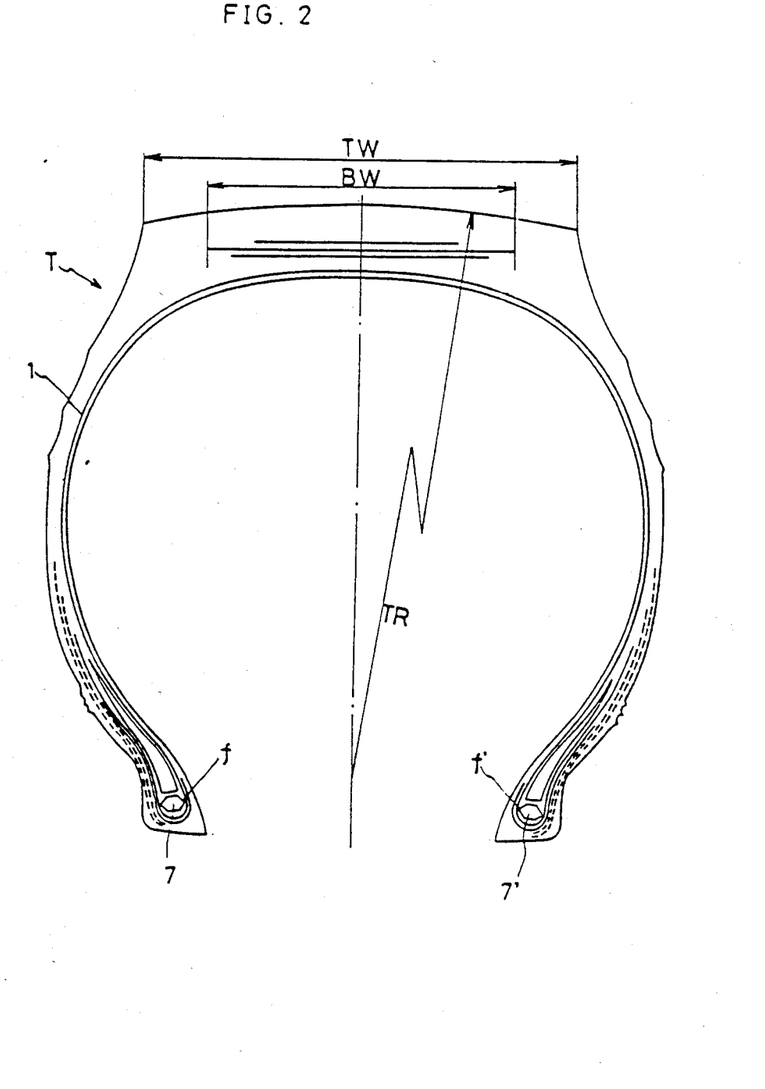
FIG. 2 is a view showing a cross-sectional structure of the steel radial tire to be used for the truck and bus.

A tire T of such kind as above comprises, as shown in FIG. 2: a carcass 1 reinforced with at least a single ply composed of carcass cords, for example, steel cords, extending substantially radially: a tread 5 reinforced with a belt structure 3 composed of a plurality of plies consisting of non-stretchable or low-stretchable cords, there plies being arranged at a sharp bias angle, for example, an angle within the range from 10° to 30°, with respect to the direction of the tire circumference and being adapted to intersect with each other; a pair of bead cores 7 rolling both ends of the carcass ply from inside to outside for fixation; and a pair of ride walls 9.

It is preferable that a width BW of the belt structure 3 reinforcing the tire tread ranges from 80 to 95% of a width TW of the tread 5 so that the tread may be widely and surely supported and reinforced. Further, the formation of a belt layer with cords intersecting with each other in triangular pattern is advantageous for the increase in stiffness thereof and reinforcement of the tread. That is to say, it is preferable for increasing stiffness of the belt structure that at least three plies each composed of low-stretchable or non-stretchable cords are stacked so as to be in direct contact with each other, wherein the adjacent two plies are arranged at bias angles equal in degree but directionally opposite to each other, preferably as small as ranging from 10° to 25°, with respect to the equatorial plane of the tire, and cords of the third ply provided an angle larger than that provided by cords of the former two plies, for example, within the range from 40° to 70° with respect to the above said equatorial plane.

Figure 1:
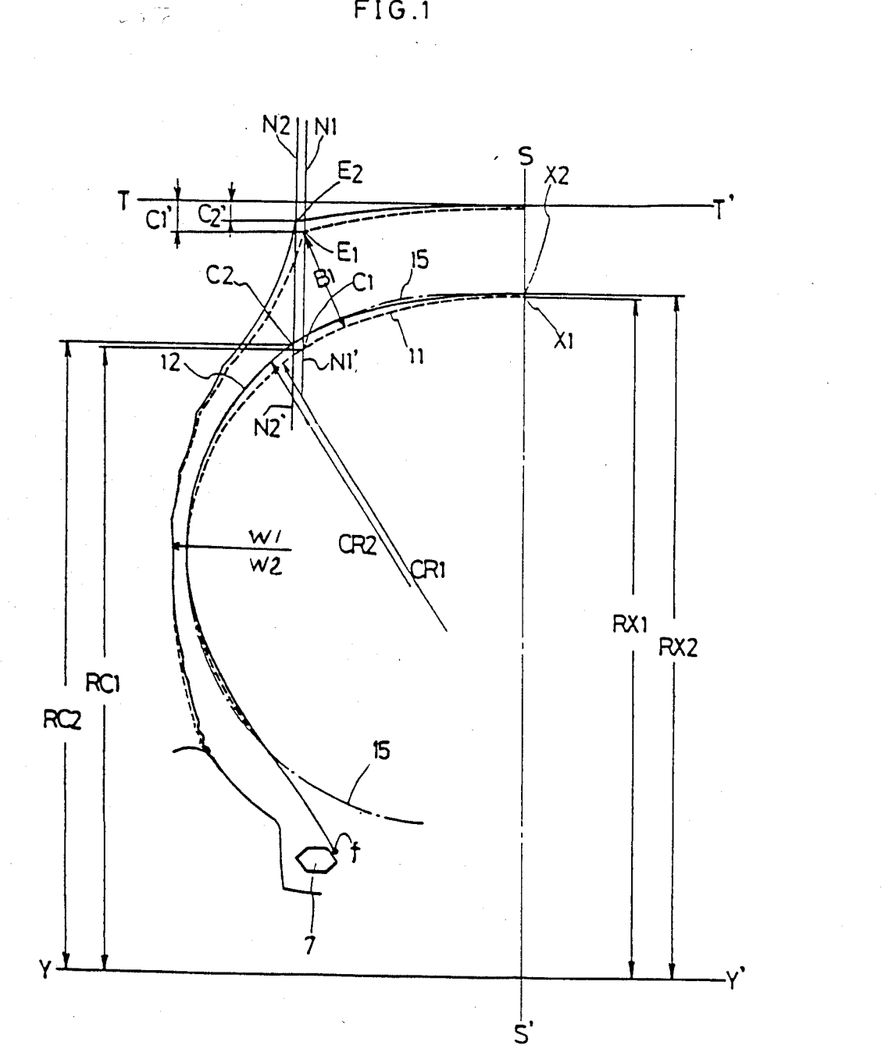
FIG. 1 schematically illustrates carcass radial profiles of a tire according to the present invention, the continuous line and the dotted line indicate a profile when the tire is inflated to have the specified maximum internal air pressure and that in the state before inflation of the tire (filled with air of 5% of the specified maximum pressure), respectively; and the alternate long and short dash line indicates a profile in a free equilibrated carcass profile.

On the assumption that the belt layer is of highly stiff structure as above, the inventor of this invention, after examining in various ways a carcass line which is arranged on the side of the tire axis adjacently to the belt layer and closely relates to a radius of tread curvature when the tire is inflated, have found that, as shown in FIG. 1: carcass parts except at the crown part firmly bound with hoop effect of the stiff belt structure as described above and at portions above the bead parts reinforced with reinforcing layers and apexes are comparatively low in stiffness in respect of structure and constituent material as well as less resistant to deformation, thereby being formed into free balanced profiles approximate to those produced by high pressure inflation of the tire and exerting a great deal of influence upon the profile of the radially expansive surface of a radius CR1 of curvature of the shoulder part of the carcass line 11 under the pressure corresponding to 5% of the specified maximum air pressure, as shown by a dotted line in FIG. 1, is larger than the other radius CR2 of curvature of the shoulder part in the shape most approximate to a free balanced profile 15 as shown by an alternate long and short dash line formed under the specified maximum pressure of air to be filled into the tire; and the object of this invention is most advantageously achieved when the ratio CR2/CR1 between radii of curvature of both profiles falls within the range from 0.7 to 0.95.

The carcass layer 2 of radial structure is in contact with bead cores 7 and 7 at points f and f. A length arcuately extending from f to f represents the width of the carcass layer 1 between bead wires and is determined by the external size of tire, belt layer, and rubber gauge. Because of the low-stretchable or non-stretchable materials arranged at an angle of 90° with respect to the equatorial plane of the tire, the above-mentioned length is not so much varied even when the tire is inflated with air of the maximum pressure.

In FIG. 1, represented are a profile 12 of the radially expansive surface of carcass corresponding to a tire mounted on the rim R, inflated with air of the specified maximum pressure, and non-loaded, and another profile 11 of the radially expansive surface of carcass corresponding to a tire inflated with air of 5% of the specified maximum pressure and non-loaded. The carcass ply is in contact with bead wires at points f and f and passes through intersections X1 andf X2 at which the locus s—s' of equatorial plane of the tire intersects with carcass profiles 11 and 12, respectively. The length f—f of the radially expansive surface of the carcass ply is twice as much as that of f—x. When the tire is inflated with air of 100% of the specified maximum pressure, a point C2 as an intersection at which the locus N2—N2' produced by a plane in contact with the tread edge E2 and parallel with the equatorial plane S—S' of the tire is spaced by radial distance RC2 from the revolving axis Y—Y' in the radial direction.

On the other hand, according to this invention, in a state that a tire is mounted on the specified rim without being loaded and inflated with air to 5% of the specified maximum pressure, it is necessary to determine a profile 11 of carcass layer in such a way that an intersecting point C1, at which the locus N1—N1' touching the tread edge E1 and extending in parallel with the locus S—S' of the equatorial plane of the tire intersecting with a carcass line 11, lies more inside radially and axially than a corresponding point C2 on the radially expansive surface profile 12 of a carcass ply of the tire put in the above-mentioned state but inflated with air of the specified maximum pressure.

Figure 10:
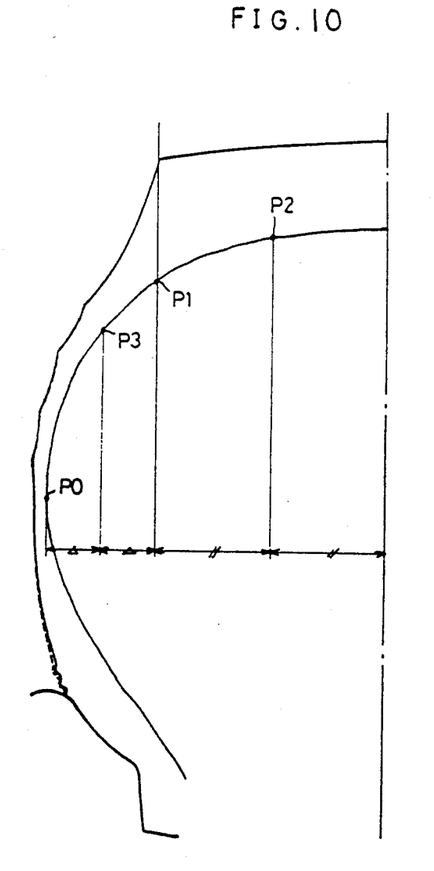
FIG. 10 schematically illustrates a carcass radial profile of a tire according to the present invention when the tire is inflated with air having 5 percent pressure of the specified maximum pressure.

As can be seen from new FIG. 10, the radius CR1 (or CR2) is defined as a radius of a circle which is drawn through three points P1, P2 and P3 on the carcass, wherein the point P1 corresponds to the intersection (C) (FIG. 1) of the carcass with the plane (N—N') including the tread edge (E); the point P2 being a center point between the point P1 and the equatorial plane (S—S') of the tire with regard to the axial direction of the tire; and the point P3 is a centerpoint between the point P1 and the maximum width point P0 of the carcass with regard to the axial direction of the tire. W1 (FIG. 1) is a maximum width when the tire is inflated to 5 percent pressure of the specified maximum pressure for the tire and W2 is the maximum width of the tire when inflated to the specified maximum pressure.

It is ideal that an intersecting point X2, at which a carcass line 12 produced when the inflating air pressure is at the maximum intersects with the locus S—S' of the equatorial plane, agrees with another intersecting point X1 at which a carcass line 11 produced when the inflating air pressure is equal to 5% of the maximum one intersects with the above-mentioned locus S—S', due to strong hoop effect exerted by the low-stretchable and stiff cords composing the belt structure 3 and arranged in triangular patterns to firmly compress the carcass, however, in practice, because of elasticity of rubber and dispersion in degrees of angles of final arrangement of cords, a point X2 is adapted to be apart from the revolving axis Y—Y' of the tire by distance RX2 which is 0.5% or under, substantially 0.3% or under, of the radial distance RX1 by which the point X1 is apart from the abovesaid axis Y—Y'. That is to say, a relation as RX1≦RX2≦0.005RX1 is adapted to be maintained.

One of the most significant characteristics of this invention is that, in the abovesaid state of the tire inflated with air of 100% of the specified maximum pressure, a circumferential length $2\pi RC1$ drawn by the point C2 corresponding to the tread edge E2, must be longer than another circumferential length $2\pi RC1$ drawn by the point C1 when the inflating air pressure is 5% of the specified maximum pressure and a ratio between lengthes RC2/RC1 must always be greater than that RX2 to RX1. That is, a tire must be designed to satisfy a relation as RC2/RC1>RX2/RX1. If RX1=RX2 and RC1=RC2, even when a tire is inflated, radial distance from the points C1 and C2 to the revolving axis Y—Y' of the tire do not vary, that is, radii of curvature of tread surfaces, too, do not vary.

If RX1=RX2 and RC1>RC2, a radial distance between the point C1 and the revolving axis Y—Y' of the tire is reduced when the tire is inflated and, therefore, the radius of curvature produces a rounder surface of the tread. In other words, such conditions that RX1=RX2 and RC1≧RC2, and RC2/RC1<RX2/RX1 are characteristics of tires depending to the prior art.

As a method of arranging a carcass line 11 at the shoulder part before inflation of the tire radially below a line approximate to a free balanced profile, i.e., a carcass line produced when the tire is inflated with air of 100% of the maximum pressure, conceivable is the extension of a length of the normal running from the tread edge E1 to the carcass line 11, that is, a simple increase in the rubber gauge B1 for lowering the carcass line 11 below the carcass line 12, however, it must be taken into consideration that the rubber gauge B1 is increased and, consequently, a higher degree of heat is generated in the tire due to increase in loss of internal energy of rubber, thereby causing decrease in durability of the tire to high speed running. Accordingly, with the increase in the radius of curvature TR1 of the tread before inflating the tire and the increase in the length C1 (will be referred to as a camber height C1 hereinafter) of a perpendicular line extending from a line segment T—T touching the equator of the tire and extending in parallel with the revolving axis Y—Y' of the tire toward the tread E1, an arrangement of a carcass line 11 below another carcass line 12 without increase in the rubber gauge B1 is made possible.

Figure 3:
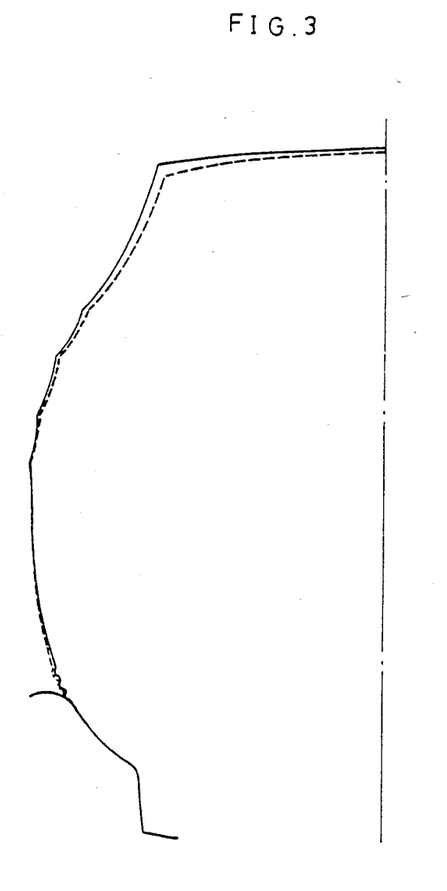
FIG. 3 is a sectional view showing a deformed state of profile of a tire according to this invention when the tire is inflated.
Figure 4:
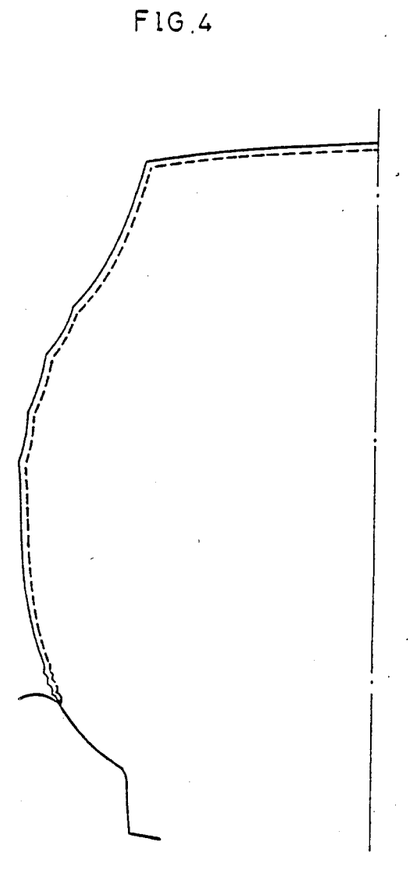
FIG. 4 is a sectional view showing a deformed state of profile of a tire according to a prior art tire when the tire is inflated with air of the specified maximum pressure.

As described above, a carcass radial profile of the tire, in which a carcass line to be produced with tire inflation at 5% of the specified maximum air pressure is adapted to extend below another carcass line 12 to be produced with tire inflation at the abovesaid maximum air pressure, is approximate to a free balanced profile having the carcass line displaced upward with tire inflation, and, therefore, a tire according to this invention is largely deformed, as shown in FIG. 3 and as apparent from an example of tire in size of 10.00R20 14PR, at a part including the buttress part extending above a level corresponding to 60% or more of the cross-sectional height of the tire and the tread part, whereas a tire as shown in FIG. 4 and having a profile according to the prior art is substantially evenly deformed throughout. In FIGS. 3 and 4, the continuous line indicates an external profile of a tire inflated to have the specified maximum internal air pressure (7.25 kg/cm$^2$) and the dotted line and external profile of a tire inflated to have the internal air pressure of 0.36 kg/cm$^2$, that is, 5% of the specified maximum pressure of 7.25 kg/cm$^2$, both profiles having been impressed on plaster. Displacement of the carcass line caused by the pressure of air blown into the tire, that is, variation in the external profile of the tire exerts influence upon distribution of tension in the carcass as a matter of course, and, in the case of a tire according to this invention, tension as well as apparent stiffness in the carcass is high as an area extending from the upper part of the side wall to the buttress and tread part where a degree of deformation is large.

Similarly, because of a larger degree of deformation (RC2−RC1) at both ends of the tread than that (RX2−RX1) at the equatorial plane of the tire, compressive strain acts on the grounding surface of the tread part and increases lateral stiffness in cooperation with the aforesaid stiffness.

And, as described below in the section of effect of the invention, these figures as above said is to bring about the improvement in durability of the tire to high speed running, saving of fuel consumption, and driving stability, in addition to the improvement in resistance of the tread crown part to cutting and wear.

At first, referring to the driving stability, the cornering power is most important for the driving stability of vehicles, and the cornering power is expressed as an angle at start of curve of cornering force. In such tires as that for truck and bus using high inner air pressure or that using belt layer composed of steel cord with high bending stiffness like radial tire, it has been known that the cornering power become large with increase of lateral stiffness of tread region. On the other hand, in the case of tire comprising a radial ply carcass, the lateral stiffness of carcass is so small that the shoulder region of such tire is apt to be lifted by virtue of torsion deformation being subject to the influence of the lateral force, which is undesirable for driving stability, the higher the apparent stiffness and the tension of carcass in the lower region than the position where the tire section width is maximum, the higher the said tendency, on the contrary, tire composed of a carcass profile according to this invention is designed to adopt the radial profile according to complete new technical concept which increases the lateral stiffness of tread to have a high contribution in increasing the cornering power by means of increasing the tension of carcass in the region between buttress and tread region and compression strain acting on the grounding part of tread, and, in addition to the above, the reinforcing layer composed of at least two rubberized ply layer each containing fiber cords such as nylon cords embedded therein, said cords of which being crossed each other at an angle of 30° to 50° with respect to a radial direction of a tire, are arranged at the outer side of the sidewall and extend upwardly from the bead base to the position where the tire section width is a maximum and a apex composed of a hard rubber stock and a soft rubber stock is disposed between the carcass ply and the turned up portion of the carcass ply and the reinforcing layers with a triangular cross section gradually decreasing the thickness towards the side wall of the tire, which contribute to increase the elasticity, as the result, when the lateral deformation is working on the tire by the lateral force with the slip angle acting on tires, the tires according to this invention display the high cornering power to give a good driving stability.

Then, as to the rolling resistance of the tires, the tread portion has the largest contribution to the rolling resistance of the tire, especially, its contribution, in the case of such heavy duty tires as tires for truck and bus, accounts for nearly 40% of all rolling resistance, including that of the buttress region, it accounts for about 50%.

Accordingly, it has been generally used to adopt the rubber compound with a high repulsive elasticity as means to reduce the rolling resistance for the low internal energy loss of tread rubber portion.

In this case, however, the wet grip performance, which is one of the most important performances to the safety of such a tire, is adversely affected undesirably depending upon the degree of the reduced rolling resistance.

In contradistinction to the above solution of the prior art, the invention of the present application resides in the discovery that by suitably changing the inflated tread radius together with increasing the stiffness by the high carcass tension in the region from buttress to trend as above-mentioned the movement of rubber caused in the tire while rolling is lowered, which leads to the remarkable reduction of the rolling resistance. In this case, the wet grip performance and the durability in high speed running are not only adversely affected but also the steering performance and the resistance to wear and cutting for the grounding part of tread can be advantageously improved.

(EXAMPLE)

Four heavy duty radial tires having a size of 10.00 R20 are provided on trial, that is, Inventive example 1 and 2 according to the present invention and comparative examples 1 and 2 according to the prior art, various kinds of tests such as tread surface strain, change in tread radius, tread cut, vertical deflection, rolling resistance, cornering force, and comfortableness in vehicle riding were performed.

Specifications of test samples are listed in Table 1.

TABLE 1

| | CR1 | CR2 | CR2/CR1 | RX1 | RX2 | RX2/RX1 |
|---|---|---|---|---|---|---|
| Comparative Example 1 | 85 | 90 | 1.06 | 491.35 | 492.85 | 1.003 |
| Comparative Example 2 | 90 | 90 | 1.00 | " | " | " |
| Inventive Example 1 | 110 | 90 | 0.82 | " | " | " |
| Inventive Example 2 | 120 | 90 | 0.75 | " | " | " |

In any of tires, the carcass is composed of one ply in which twisted steel cords (7×4/0.175 mm) disposed at an angle of 90 with respect to the equatorial line of the tire and the belt structure 3 is composed of twisted steel cords (1×3/0.20+6/0.38 mm), a first belt being disposed at 67° with respect to the equatorial plane of the tire whereas the second through fourth belts at 16°.

Figure 5:
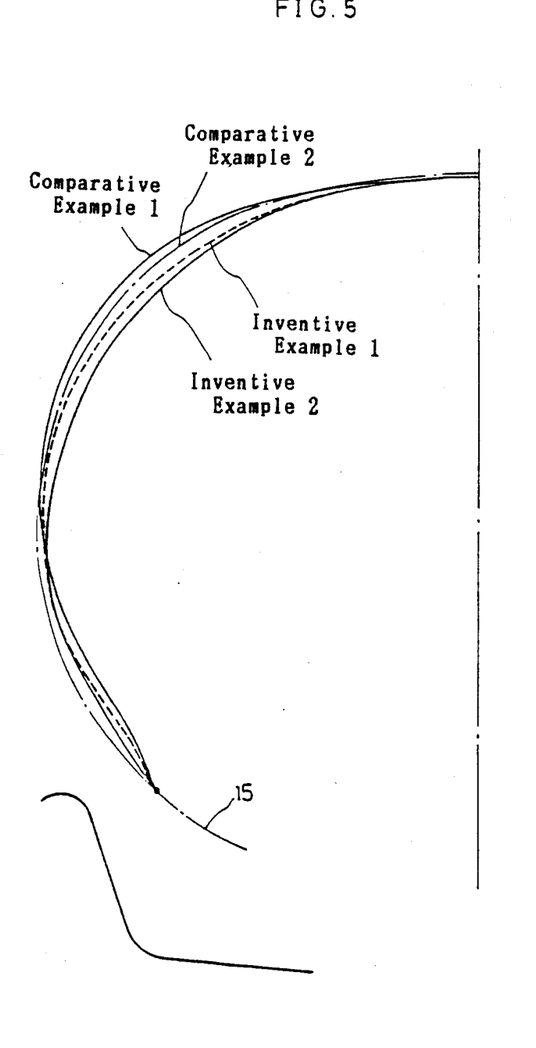
FIG. 5 is a sectional view of carcass profile of tires presented for testing.

A belt adjacent to the carcass layer is referred to as the first belt, and succeeding ones as the second, third, and fourth in turn, the carcass profiles of tests tires are shown in FIG. 5.

Component materials such as tread and others are common to all tires.

At first, tread surface strain and tread radius were measured on these tires, and succeeding cut test of tread rubber.

The test results were shown in Table 2.

TABLE 2

| Tires | Tread radius *3 | | Tread surface (%) *2 | Depth of cut (mm) *1 |
|---|---|---|---|---|
| | TR1 | TR2 | | |
| Comparative Example 1 | 560 | 530 | + 1.6 | 15.0 |
| Comparative Example 2 | 560 | 560 | 0 | 8.0 |
| Inventive Example 1 | 520 | 650 | − 1.4 | 4.0 |
| Inventive Example 2 | 475 | 620 | − 1.6 | 2.8 |

Figure 6:
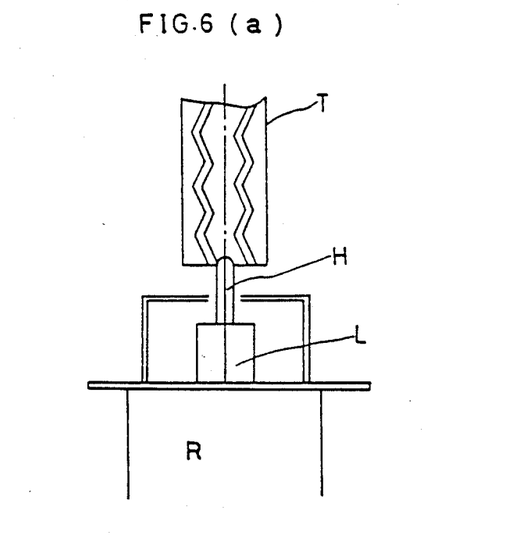
FIG. 6 is a view of the mechanism of a machine and a tool for showing a method of testing resistance of the tread to cutting.
Figure 7:
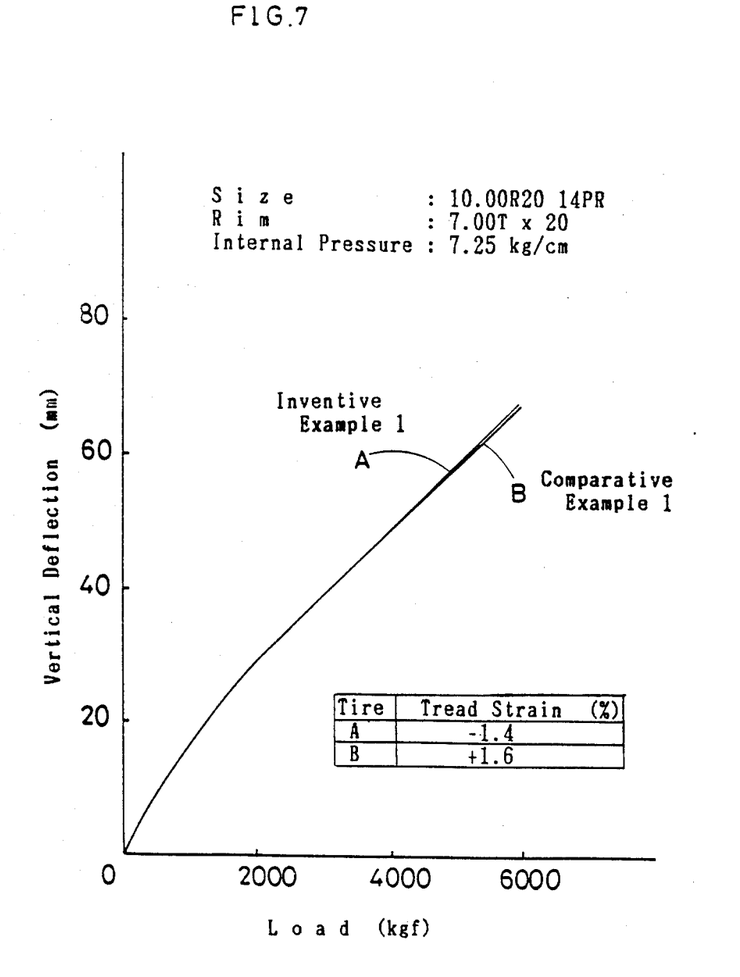
FIG. 7 is a curvilinear diagram showing the relation between load and deflection of tires.
Figure 8:
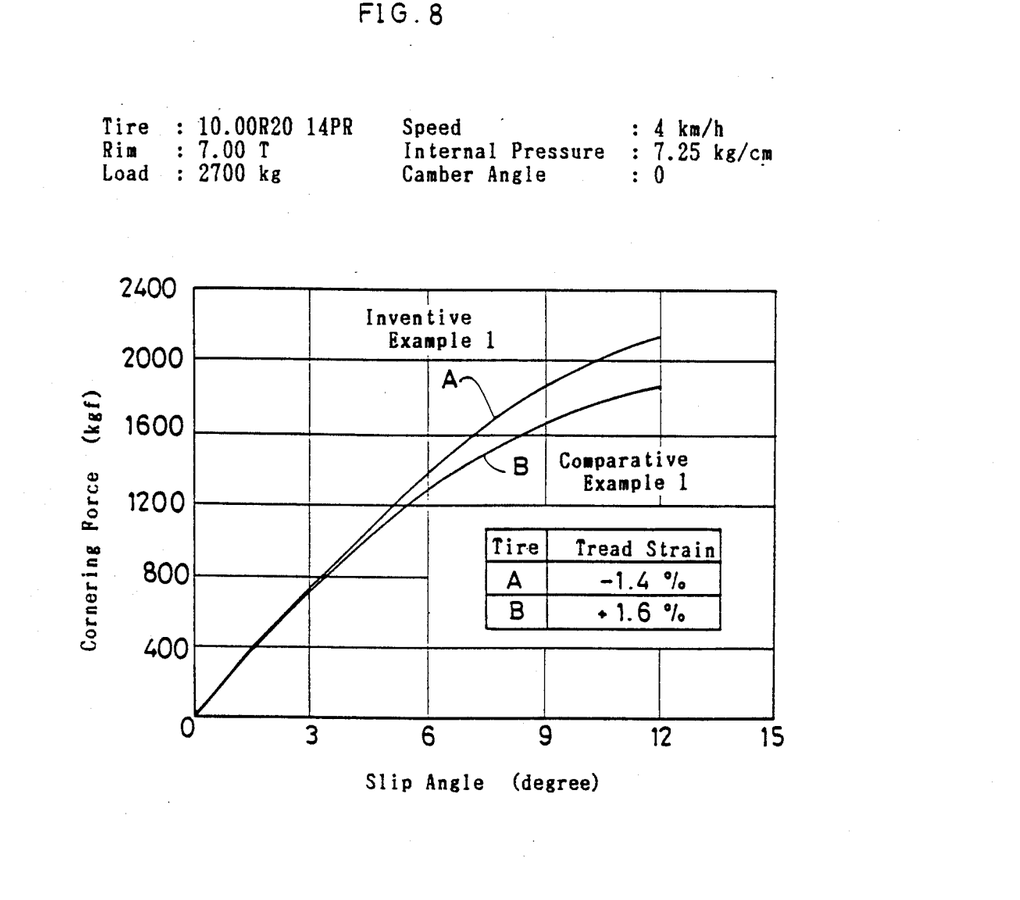
FIG. 8 is a curvilinear diagram showing the cornering force at every degree of slip angle.

*1 The term "depth of cut" means a depth of a cut produced on the tread when a jig T as shown in FIG. 6 is pressed with a certain intensity of force to a tire inflated to have the specified maximum internal air pressure.
*2 "Tread surface strain" is a term defined in such a way that, when a length drawn on the tread surface between scale marks each 10 mm long along the direction of the tire axis increases with inflation of the tire, tensile strain (+) acts and, when said length decreases, compressive strain (−) acts.
*3 Tread radius was measured by R-guage. Next, results of investigation about the vertical spring rate as a scale for evaluating comfortableness in vehicle riding and stability in driving and about the relation between cornering force and tread surface strain provide a data that, as shown in FIG. 7 and FIG. 8, the tire of Example 1 according to this invention in which compressive strain acts on the tread surface is not different in degree of deflection from Comparative Example 1 in which tensile strain acts but approximately 10% higher in intensity of cornering force. This data reflects that high tension of the carcass ply acting on the portion extending from buttress to tread part and compressive strain acting in the direction of the tire axis provide higher lateral stiffness at the grounding surface.

From the above said facts, it can be said that comfortableness in vehicle riding provided by a tire having a profile according to this invention is not different, as will be referred to later again, from that by the conventional tire but superior in respect of stability in driving.

Figure 9:
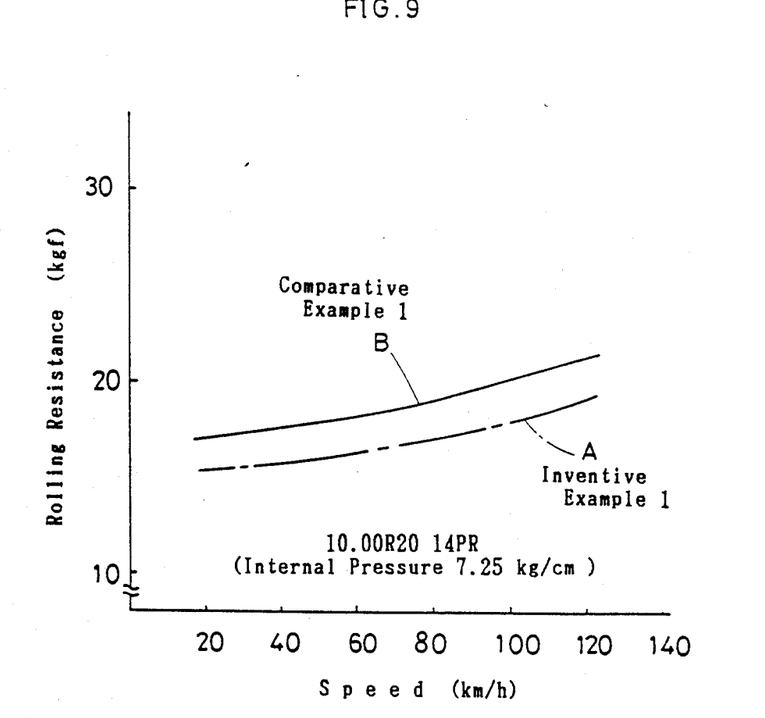
FIG. 9 is a curvilinear diagram showing the relation of speed with rolling resistances.

Similarly, comparison of the rolling resistance of a tire of Example 1 according to this invention with that of Comparative Example 1 of the prior art, as shown in FIG. 9, indicates that the former is 10% or more below than the latter and, proportionately, contributes to reduction in fuel consumption. The reason is that the movement of rubber in the tire according to this invention occurring every revolution of the tire is smaller than that of the conventional tire in the areas extending from the grounding surface to buttress parts and, as a result, energy loss in the tire is reduced.

The same remark as above is applicable to heat generation in the tire, too.

The rolling resistance is evaluated by resistance of a tire during running after the tire is pressed to the surface of a steel drum of 1.7 m in diameter so as to be loaded as specified, and driven for warming up for about 45 minutes at a speed and with an internal pressure as specified.

Next, intensity of reactive force generated in the revolving axis of tires of Comparative Example 1 and Inventive Example 1 during running over protrusions in the test course and data as shown in Table 3 for comparing two examples with respect to comfortableness in riding during jolt were obtained.

TABLE 3
Comparison of test results of comfortableness in riding

|  | Speed | Comparative Example 1 | Inventive Example 1 |
| --- | --- | --- | --- |
| Vertical reactive force during ride over protrusions | 50 km/h | 100 | 100 |
|  | 80 km/h | 100 | 102 |
| Back-and-forth reactive for during ride over protrusions | 50 km/h | 100 | 101 |
|  | 80 km/h | 100 | 100 |

This table shows the results of measurements of reactive force in Inventive Example 1 in term of index based on the assumption that the index of the reactive force in Comparative Example 1 is 100, wherein the larger the index, the better the comfortableness in vehicle riding.

From Table 3, a tire according to the present invention is found to be superior to the prior art tire in providing comfortableness in vehicle ridings.

The reason for the above fact is that a great deal of flectional deformation inflicted on the tire when the tire rides over protrusions on the ground is absorbed by side wall parts of the tire. In the tire according to this invention, tension in the carcass ply is low in the region extending from positions, at which deformation absorption capacity reaches the maximum and between which the largest width of the tire lies, to the bead parts under the side wall portions, whereby tension distribution in the said region are capable of absorbing flectional deformation comparatively easily.

Next, values obtained from comparison of wet grip performances are shown in Table 4.

TABLE 4

|  | Comparative Example 1 | Inventive Example 1 |
| --- | --- | --- |
| Index of wet slip | 100 | 107 |

Wet grip performances were observed by confirming breaking distances travelled by the actual vehicle driven at a speed of 80 km/h on the asphalt-paved wet road, and indicated in terms of index on the assumption that the index of breaking distance of Comparative Example 1 is 100. In this case, too, the larger the index, the better the performance, and a tire of Inventive Example 1 which exhibited a strong breaking force is verified to be excellent in wet grip performance which is one of the most important requirements for safety of vehicle drivings.

As above mentioned, wet grip performance depends on the stiffness in the tread region, what is above mentioned, indicates the fact that, when the vehicles runs over the wet road in high speed, the tire according to the present invention has a high force to break through the resistance to water on the road, and, proportionately, has a high speed limited to induce hydroplainings, in the view point as above mentioned, the tire of this invention provides the high safety.

Moreover, in view of improved road conditions of these days, importance must be attached to durability of a tire of such kind as above and test of durability to high speed running for said both tires was performed according to the following method, results thereof being shown in Table 5.

TABLE 5

|  | Breaking speed: | Running time |
| --- | --- | --- |
| Comparative Example 1 | 80 km/h | 80 min. to breakage |
| Inventive Example 1 | 90 km/h | 90 min. to breakage |

Tire were driven on the drum type driving tester according to the stepped speed running method on conditions that:

| Load: | 3,780 kg |
| --- | --- |
| Initial internal pressure: | 7.25 kg/cm$^2$ |
| Rim: | 7.50 V |

Wherein results were evaluated by the level of speed at which the tire was broken due to heat generation and the length of time spent for running at the above speed. In thus test, the tire according to the present invention cleared a speed of 80 km/h but the tire according to the prior art could clear only 70 km/h, lower by one order than 80 km/h. The reason is that the movement of rubber of the tire according to the present invention occuring every revolution of the tire is smaller than that of the prior art tire in the region extending from the grounding surface to buttress parts and, camber height C1 was made to be large dimension so that the rubber gauge B1 at both tread shoulder parts can be designed to be mere thin than that of the prior art tire.

Next, as regards to resistance of the tread to wear, comparison tests using the actual vehicles were performed and amounts of wear of tread per 1,000 km running were compared by measurements of grooves after 50,000 km running. As shown in Table 6, a tire according to this invention demonstrated over 10% improvement of resistance to wear thanks to heat generation to a low degree, more uniform distribution of grounding pressure, and compression strain acting on the tread surface.

TABLE 6
Results of tests of resistance to wear using actual vehicles

|  | Index of wear of tread * |
| --- | --- |
| Comparative Example 1 | 100 |
| Inventive | 112 |

TABLE 6-continued

Results of tests of resistance to wear using actual vehicles

| | Index of wear of tread * |
|---|---|
| Example 1 | |

* a larger value means a superior performance

(EFFECT OF THE INVENTION)

As mentioned above, the present invention provides a well-balanced tire in which the carcass radial surface profile is expanded radially outwardly at both shoulder parts when the tire is inflated so that resistance to wear, durability to high speed running (low degree of heat generation), resistance to cutting, and rolling resistance (low fuel consumption) including wet grip performance and stability in vehicle dirving may be advantageously improved without reducing comfortableness in vehicle riding when subjected to jolting.

We claim:

1. A pneumatic radial tire constructed to increase tread lateral stiffness, comprising;
    a tread with a radially outer profile curved in a plane including the tire axis;
    a carcass reinforced by at least one carcass ply of substantially radially arranged unstretchable parallel cords, and said carcass having carcass shoulders radially inside both ends of said tread;
    a belt, disposed between the carcass and the tread, and comprising at least two plies of parallel cords arranged at a comparatively small degree of angle with respect to the circumferential direction of the tire to cross the cords of each ply with the cords of the next ply so that when the tire is mounted on a rim officially specified for use with said tire and inflated to specified maximum pressure, said carcass shoulders move radially outwardly and a carcass center therebetween does not move substantially;
    in which said tread profile increases in radius of curvature by the outward movement of the carcass shoulders upon increase in the air pressure, and the radius of curvature of said tread profile satisfies the following relation:

$$1.2 \leq TR2/TR1 \leq 1.5$$

where TR1 is the radius of curvature when the tire is inflated to 5% pressure of the specified maximum pressure, and TR2 is the radius of curvature when inflated to the specified maximum pressure,
whereby a compressive strain in the axial direction of the tire is caused to occur in the tread and its lateral stiffness is increased.

2. A pneumatic tire as set forth in claim 1, wherein said carcass shoulders decrease in radius of curvature with increase in the air pressure, and the radius of curvature of each carcass shoulder satisfies the following relation:

$$0.7 \leq CR2/CR1 \leq 0.95$$

where CR1 is the radius of curvature when the tire is inflated to 5% pressure of the specified maximum pressure, and CR2 is the radius curvature when inflated to the specified maximum pressure.

3. A pneumatic tire as set forth in claim 5, wherein a portion of said carcass laid in each maximum width part of the tire which defines the maximum width of the tire stays substantially in its position when the tire is inflated at 5% of the specified maximum pressure as well as when the tire is inflated at the specified maximum pressure.

4. A pneumatic tire as set forth in claim 2, wherein a portion of said carcass laid in each maximum width part of the tire which defines the maximum width of the tire stays substantially in its position when the tire is inflated at 5% of the specified maximum pressure as well as when the tire is inflated at the specified maximum pressure.

5. A pneumatic tire as set forth in claim 3, wherein a portion of said carcass radially inside the maximum width part of the tire moves axially inwardly of the tire with increase in the air pressure.

6. A pneumatic tire as set forth in claim 5, wherein a radius (RC) of intersection (C) of the carcass with a plane (N—N') which is parallel with the equatorial plane of the tire and including the tread edge (E) increases with increase in the air pressure.

7. A pneumatic tire as set forth in claim 6, wherein a radius (RX) of intersection (X) of the carcass with the equatorial plane (S—S') of the tire satisfies the following relation:

$$1 \leq RX2/RX1 \leq 1.005$$

where RX1 is the radius when the tire is inflated to 5% pressure of the specified maximum pressure, and RX2 is the radius when inflated to the specified maximum pressure.

8. A pneumatic tire as set forth in claim 4, wherein a portion of said carcass radially inside the maximum width part of the tire moves axially inwardly of the tire with increase in the air pressure.

9. A pneumatic tire as set forth in claim 7, wherein said parallel cords of each belt ply are arranged at an angle of 10 to 30 degrees to the circumferential direction of the tire.

10. A pneumatic tire as set forth in claim 9, wherein the width of said belt is in a range of 80 to 95% of the width of the tread.

* * * * *